(12) United States Patent
Holleczek et al.

(10) Patent No.: US 11,543,494 B2
(45) Date of Patent: Jan. 3, 2023

(54) METHOD AND DEVICE FOR SCANNING A SOLID ANGLE

(71) Applicant: Robert Bosch GmbH, Stuttgart (DE)

(72) Inventors: Annemarie Holleczek, Stuttgart (DE); Matthias Baier, Lehrensteinsfeld (DE); Reiner Schnitzer, Reutlingen (DE); Remigius Has, Grafenau-Daetzingen (DE); Siegwart Bogatscher, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 518 days.

(21) Appl. No.: 16/616,188

(22) PCT Filed: May 22, 2018

(86) PCT No.: PCT/EP2018/063277
§ 371 (c)(1),
(2) Date: Nov. 22, 2019

(87) PCT Pub. No.: WO2018/215399
PCT Pub. Date: Nov. 29, 2018

(65) Prior Publication Data
US 2020/0209360 A1    Jul. 2, 2020

(30) Foreign Application Priority Data

May 26, 2017 (DE) .......................... 102017208900.8

(51) Int. Cl.
*G02B 26/10* (2006.01)
*G01S 7/481* (2006.01)
(Continued)

(52) U.S. Cl.
CPC .......... *G01S 7/4817* (2013.01); *G01S 7/4815* (2013.01); *G01S 7/4816* (2013.01); *G01S 17/10* (2013.01);
(Continued)

(58) Field of Classification Search
CPC .... G01S 7/4817; G01S 7/4815; G01S 7/4816; G01S 17/10; G01S 17/42; G02B 27/144;
(Continued)

(56) References Cited

U.S. PATENT DOCUMENTS

| 5,870,181 A | 2/1999 | Andressen |
| 2010/0046953 A1* | 2/2010 | Shaw ...................... H01S 5/423 398/115 |

(Continued)

FOREIGN PATENT DOCUMENTS

| DE | 102006053639 A1 | 5/2008 |
| DE | 102009037141 A1 | 2/2011 |

(Continued)

OTHER PUBLICATIONS

Yamada, et al.: "A Position Sensor with Laser Beam Scan Which Detects the 3-D Points Extracted by Image Differentiation Function", Japanese Society of Robot Science, 7(6), (1989), pp. 23-29.

(Continued)

*Primary Examiner* — Mustak Choudhury
(74) *Attorney, Agent, or Firm* — Norton Rose Fulbright US LLP; Gerard Messina (57) ABSTRACT

A method for scanning solid angles is provided using at least two electromagnetic beams, at least one electromagnetic beam being generated that is subsequently deflected along a horizontal angle and/or along a vertical angle with the aid of a rotatable mirror; the solid angles being scanned using the at least one electromagnetic beam; and at least one reflected electromagnetic beam being received, after being reflected off an object, by a receiving optics that is pivotable along the horizontal angle synchronously with the mirror. Furthermore, a LIDAR device for carrying out the method is provided.

13 Claims, 5 Drawing Sheets

(51) Int. Cl.
    *G01S 17/10* (2020.01)
    *G02B 26/08* (2006.01)
    *G02B 27/14* (2006.01)

(52) U.S. Cl.
    CPC ....... *G02B 26/0816* (2013.01); *G02B 26/101* (2013.01); *G02B 27/144* (2013.01)

(58) Field of Classification Search
    CPC . G02B 27/106; G02B 26/0816; G02B 26/101
    See application file for complete search history.

(56) References Cited

U.S. PATENT DOCUMENTS

2015/0055117 A1    2/2015   Pennecot et al.
2018/0275249 A1*   9/2018   Campbell ............... G01S 17/89

FOREIGN PATENT DOCUMENTS

| | | | |
|---|---|---|---|
| DE | 102011000978 | A1 | 8/2012 |
| DE | 102015013710 | A1 * | 4/2017 |
| DE | 102015013710 | A1 | 4/2017 |
| EP | 3070497 | A1 | 9/2016 |
| EP | 3165946 | A1 | 5/2017 |
| JP | H08248133 | A | 9/1996 |
| JP | 2010509624 | A | 3/2010 |
| JP | 2013205095 | A1 | 10/2013 |
| JP | 2017090144 | A | 5/2017 |
| KR | 20140025041 | A | 3/2014 |
| KR | 20160112876 | A | 9/2016 |
| WO | 2016056545 | A1 | 4/2016 |

OTHER PUBLICATIONS

International Search Report for PCT/EP2018/063277, dated Aug. 24, 2018.

* cited by examiner

METHOD AND DEVICE FOR SCANNING A SOLID ANGLE

FIELD

Method for scanning a solid angle using at least one electromagnetic beam as well as a LIDAR device

BACKGROUND INFORMATION

Some conventional rotating 3D scanners are operated according to the LIDAR (light detection and ranging) principle. In this case, a laser beam is usually deflected in a meandering manner, so that a solid angle may be scanned. In order to deflect along a vertically running rotation axis, an additional deflection of the laser beam is also added along a horizontal rotation axis or pivoting axis. The laser beam is usually deflected in a line-shaped manner in such a way that the entire solid angle is scanned having a defined resolution. The distance between the scanning paths of the laser beam is particularly decisive. A compromise must thus be made between the resolution and a scanning frequency of a device of this type. In order to cover the gaps between the scanning paths of the laser beam and to increase the resolution capacity of a 3D scanner, an interlaced method may be used, for example, that may reduce, similarly to an interlaced field technique, possible distances between the scanning paths with the aid of multiple scanning processes or additional scans. Here, the scanning frequency is reduced by the number of the additional scans, however.

SUMMARY

An object of the present invention includes providing a LIDAR device and a method for scanning a range or a solid angle having an increased resolution and at least the same scanning frequency.

This object may be achieved with the aid of the present invention. Advantageous embodiments of the present invention are described herein.

According to one aspect of the present invention, a method for scanning solid angles is provided using at least one electromagnetic beam. In a first step, at least one electromagnetic beam is generated and subsequently deflected about a horizontal angle and/or about a vertical angle with the aid of a rotatable or pivotable mirror. The at least one electromagnetic beam is split into at least two partial beams having different solid angles with the aid of a diversification device, such as a beam splitter, for example, the scanning of the solid angle taking place with the aid of the at least two electromagnetic beams. These at least two electromagnetic beams may be reflected off or scattered by objects in space. At least one reflected electromagnetic beam is received by a receiving optics that is pivotable synchronously with the mirror along the horizontal angle. The entire pivoting range of the mirror and thus of the entire angle range covered by an electromagnetic beam in space may be displayed on a corresponding detector element.

In this way, the measuring rate of a scanner or of a LIDAR device, which represents the number of the measuring points per rotation or angle range, is at least doubled. The frame rate or scanning frequency may remain the same or be increased in this case. The at least one electromagnetic beam is preferably generated by a laser or another light source, such as strongly focused LEDs, for example. The laser may be positioned in a steady-state manner, i.e., not rotatably, and radiate in the direction of the vertically running rotation axis onto a mirror or micromirror. This may simplify the thermal connection of the laser. The horizontal angle and the vertical angle span a solid angle in this case, which may be conical or pyramidal. The at least two beams may be situated horizontally adjacent to one another, so that at least two scanning paths, which may be situated adjacent to one another, are formed from each scanning path. In this way, a larger horizontal angle may be scanned at the same scanning frequency or an increase in the scanning frequency may be made possible, however, at the same horizontal angle. In the case of the same horizontal angle and the same scanning frequency, an increase in the horizontal resolution may be achieved. Each scanning path is made up of a plurality of measuring points or beam impulses having a time interval with regard to one another. The time interval may be used to unambiguously assign each generated measuring point in the case of an evaluation of received reflected measuring points to a generated measuring point. Alternatively, the at least two beams may be situated vertically adjacent to one another, so that the vertical angle, the scanning frequency or the vertical resolution may be increased analogously to a horizontal positioning. Combinations of the properties are possible. Alternatively or additionally, an appropriate deflection mirror having low requirements may be used at a maximally possible pivoting range. This results in a greater design freedom when implementing the mirror or a p mirror. Furthermore, blooming may be prevented or at least reduced, since the particular beams are displayed on separate detector elements as a result of the receiving optics. Since the at least one generated electromagnetic beam is split into at least two partial beams having different solid angles, the incident contact points of the at least two received beams on the detector elements are moreover spatially at a great distance from one another. Therefore, the overexposure of one detector element cannot or may only to a limited extent result in an overexposure of adjoining detector elements.

According to one exemplary embodiment of the method, the at least two electromagnetic beams are generated by at least two angularly offset beam sources. Here, two or more adjoining beam sources, such as lasers, for example, may be situated adjacent to one another and each emit one beam onto a mirror. The at least two beam sources may be angularly offset, so that subsequent to the deflection process through a mirror, the beams also have an angular offset with regard to one another. Alternatively, the at least two beam sources may also be oriented in parallel to one another and thus generate parallel beams. The angular offset may be implemented through a mirror curvature in this case. Furthermore, an angular offset of the at least two beams may be enlarged or downsized via a mirror curvature.

According to another exemplary embodiment of the method, at least one electromagnetic beam is generated by the at least one beam source, the at least one electromagnetic beam being split into at least two electromagnetic beams with the aid of a beam splitter connected downstream from the rotatable mirror. A beam splitter may be implemented, for example, by multiple mirrors that are partially permeable by the electromagnetic beams. Based on an orientation or angle position of the mirrors, the particular branched-off beams may have an individual angle in relation to one another. The beams may be, for example, oriented in parallel to one another or have a variable angular offset to one another. Alternatively, the generated beam may also be divided or split uniformly or non-uniformly into at least two beams by a prism, a beam splitter cube, or a diffractive optical element. The beam splitter is preferably situated in an optical path of the at least one electromagnetic beam.

In another exemplary embodiment of the method, the at least two generated electromagnetic beams are generated at a distance from one another. In this way, the generated electromagnetic beams have a defined distance from one another that is independent of an object or target to be scanned. This may simplify an evaluation of the scanned range.

According to another exemplary embodiment of the method, the at least two generated electromagnetic beams are generated at an angular offset with regard to one another. In this way, the generated beams have an angular offset with regard to one another, so that the beams go farther away from one another as the distance of at least one beam generator increases. In this way, a larger angle range may be scanned.

In one preferred exemplary embodiment of the method, at least two parallel electromagnetic beams are combined in each case to each form a beam group. In this way, all beams of a beam group have the same angle in relation to a joint optical axis. Other or further beam groups have deviating angles. In this way, at least two beams that are generated and subsequently reflected off a scanned object point are deflected by a receiving optics in such a way that the beams of a particular beam group hit a detector element. This has an advantageous effect on the eye safety in close range. In close range, the required light energy is split between the number of the beams included in a beam group. Since it is no longer the case that a single beam is used to scan a solid angle, but at least two beams are used, each beam may be designed to be weaker, so that eye safety may be improved, since the beams possibly coming in contact with the eyes are concentrated less strongly or are less intense. In far-field, the individual beams of a beam group are superimposed upon one another, so that the light energy hits an object point as one focused beam. Compared to a system based on individual electromagnetic transmission beams, an increased measuring range may be achieved here with regard to eye safety.

According to another exemplary embodiment of the method, the at least two electromagnetic beams of at least one beam group are generated in such a way that they are oriented in parallel to one another. In this way, multiple beams of a beam group may have the same angle in relation to a joint optical axis. Other or further beam groups may have a deviating angle. As a result of all beams of a beam group having the same angle, a beam group may be implemented in a technically simple manner.

According to another exemplary embodiment of the method, the at least one reflected electromagnetic beam that is received by the receiving optics is guided to at least one detector group. Here, each generated beam group may be assigned a detector group. The receiving optics may deflect or guide reflected beams to certain detector groups depending on their angle or deviation from an optical axis of the receiving optics.

In another exemplary embodiment of the method, at least one detector element is assigned to at least one generated electromagnetic beam or beam group based on a distance or an angular offset. The detector elements may be situated in relation to an emission angle or an orientation of the generated beam groups, so that the reflected beams of a defined beam group may preferably hit a detector element provided therefor.

According to another aspect of the present invention, a LIDAR device is provided for scanning solid angles using at least one electromagnetic beam. The LIDAR device has at least one beam source for generating at least one electromagnetic beam. The at least one generated electromagnetic beam may be deflected by a mirror along a horizontal angle and/or along a vertical angle. The device includes a receiving optics, rotatable synchronously with the mirror, for receiving at least one electromagnetic beam reflected off an object, at least two electromagnetic beams being generated.

In this way, at least two scanning paths situated adjacent to one another may be generated instead of one scanning path. Possible gaps between the scanning paths may thus be narrowed to increase a resolution of the LIDAR device, since at least two scanning paths are already generated during a swiveling movement of the mirror. Alternatively, the time for scanning a defined solid angle or angle may be reduced and thus the scanning frequency may be increased depending on the number of the generated beams, while the distances between the scanning paths remain the same. The scanning paths may run linearly in the vertical or horizontal direction or in a meandering manner.

According to one exemplary embodiment of the LIDAR device, the mirror, the receiving optics and the at least one detector element are rotatable dependently on or independently of one another along a vertically running rotation axis. Here, the receiving optics may rotate or pivot simultaneously with the mirror or have a time delay. The at least one detector element or detector array may be coupled to the receiving optics or be steady-state or situated independently of the other rotatable components of the device. The mirror or micromirror, the receiving optics and the at least one detector element preferably carry out congruent movements.

In one preferred exemplary embodiment of the LIDAR device, the mirror is pivotable orthogonally with regard to the rotation axis. A mirror of this type may be designed technically particularly simply. In this case, the rotation axis is advantageously congruent with at least one electromagnetic beam generated by the beam source prior to the beam being able to be deflected by the mirror. The beam source may thus be designed to be steady-state, so that the beam source is subjected to less mechanical stress during the operation of the LIDAR device. Furthermore, a steady-state beam source may be optimally thermally controlled and technically easily connected to downstream evaluation units.

In the following, preferred exemplary embodiments of the present invention are explained in greater detail with reference to the highly simplified schematic figures.

DETAILED DESCRIPTION OF EXAMPLE EMBODIMENTS

In the figures, the same constructive elements have the same reference numerals in each case.

Figure 1A:
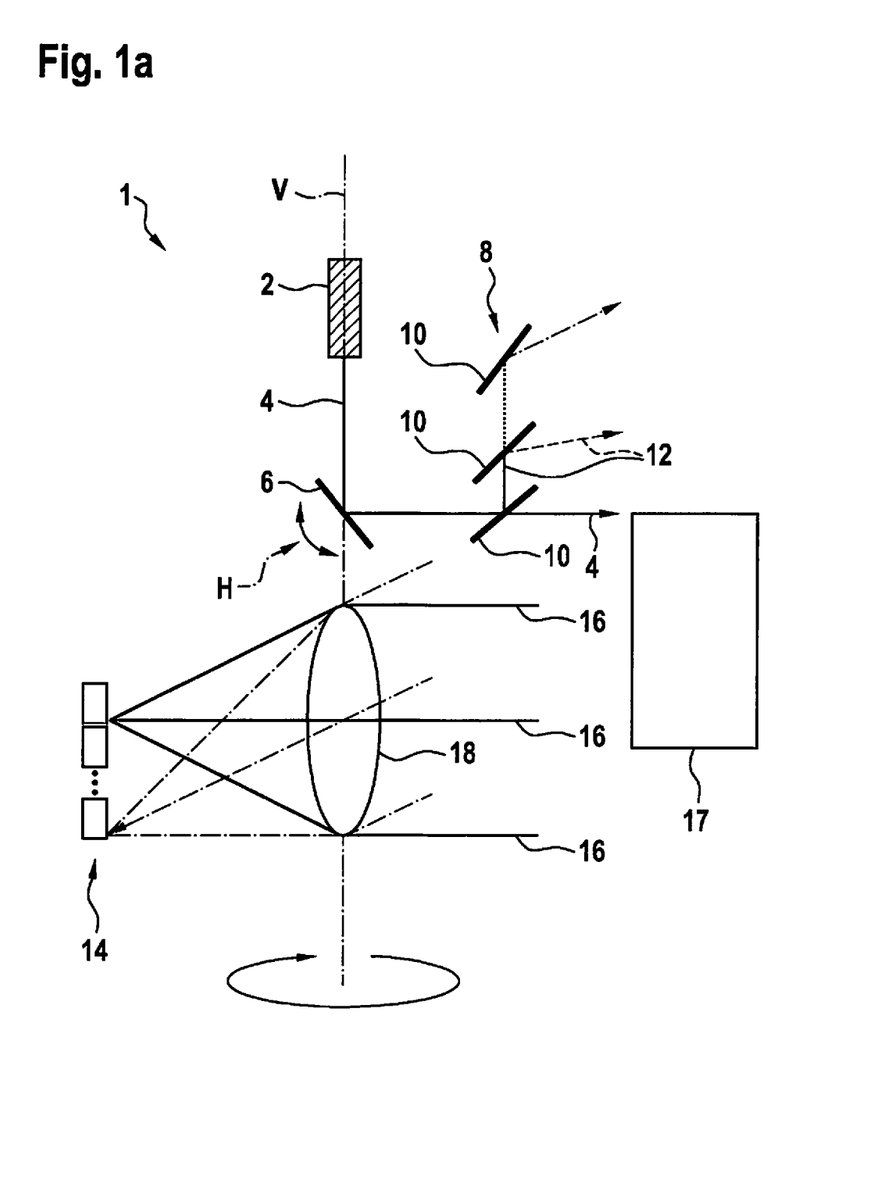
FIG. 1a shows a schematic illustration of a LIDAR device according to a first exemplary embodiment.
Figure 1B:
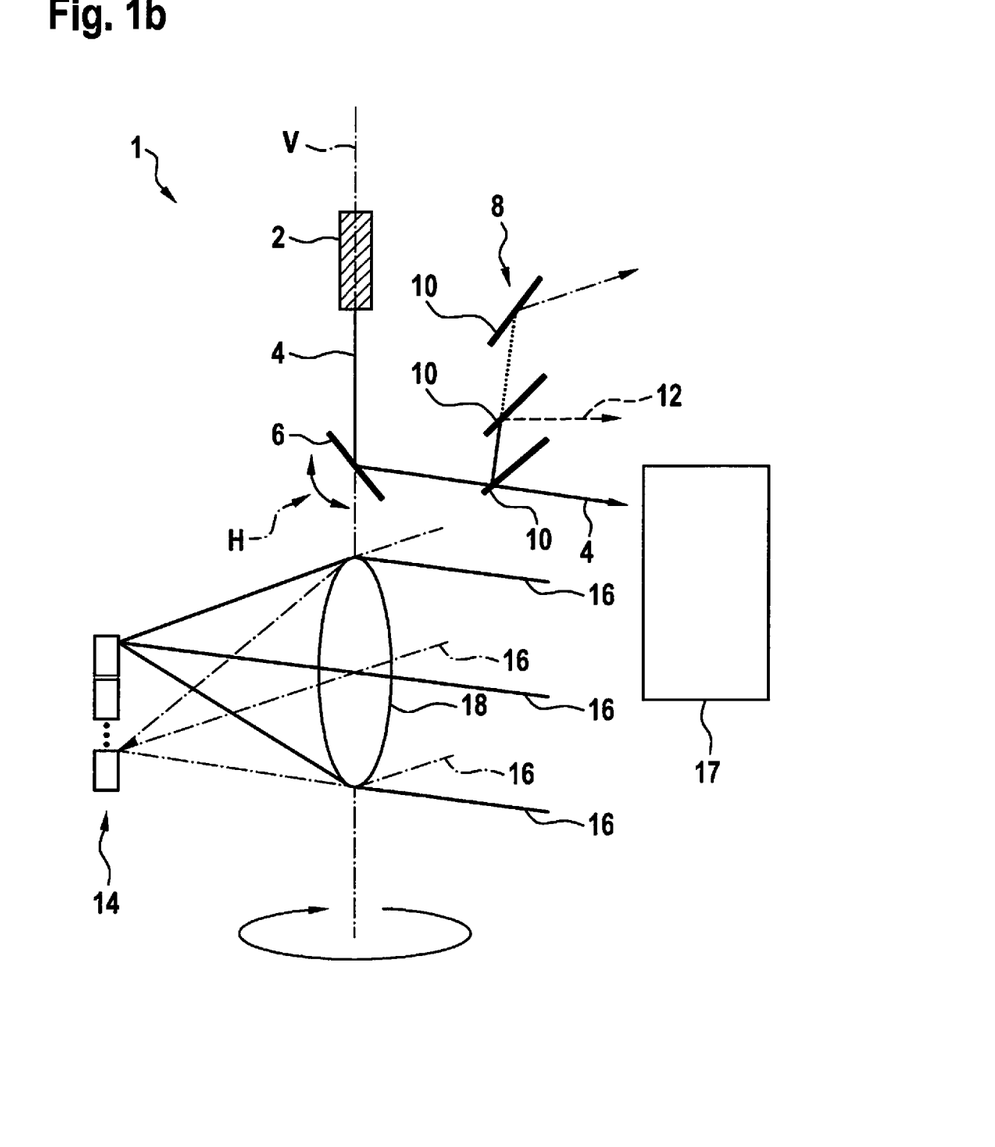
FIG. 1b shows a schematic illustration of a LIDAR device according to the first exemplary embodiment including a deviating deflection of a mirror.

FIGS. 1a and 1b show a first exemplary embodiment of a LIDAR device 1. LIDAR device 1 includes a beam source 2, which is a laser 2 according to the first exemplary embodiment. Laser 2 is situated in device 1 in a steady-state manner and generates an electromagnetic beam 4. Generated beam 4 runs vertically from laser 2 to a mirror 6 and defines a vertical rotation axis V of device 1. Mirror 6 is situated in device 1 in such a way that vertical rotation axis V runs centrally through mirror 6. Mirror 6 reflects generated beam 4 and deflects beam 4 into a defined direction. Mirror 6 is rotatably mounted along rotation axis V and may, for example, rotate or pivot freely in an arbitrarily defined range. During a rotation, mirror 6 performs an uninterrupted movement that is directed into a direction of rotation. During a pivoting process, the mirror changes its direction of pivoting or rotation upon reaching certain angles, i.e., horizontal angle or vertical angle. During a rotation or pivoting, mirror 6 continuously deflects generated beam 4 according to an orientation of mirror 6. Mirror 6 has an additional horizontal rotation axis H. Mirror 6 performs a swiveling movement at a defined vertical angle along horizontal rotation axis H. According to one exemplary embodiment, a beam splitter 8 is connected downstream from mirror 6 in a beam path of electromagnetic beam 4. Beam splitter 8 may include multiple partially permeable mirrors 10 that preferably partially let through and partially reflect generated beam 4. Alternatively, beam splitter 8 may also be a beam splitter prism. Beam splitter 8 is rotatable about the vertical rotation axis and connected to mirror 6, so that generated beam 4 is optimally guided onto beam splitter 8. Partially reflected beam 12 is guided onto a further partially permeable mirror 10, where it is again partially transmitted and partially reflected. This makes it possible to generate multiple beams 4, 12. Beams 4, 12 are spaced apart from one another along a vertical orientation of device 1. Split beams 12 have an emission angle that deviates from original beam 4, thus allowing for scanning of a larger vertical angle. The vertical angle and the horizontal angle span a solid angle that may be conical or pyramidal. Generated beams 4, 12 are operated in a pulsed manner and deflected along the entire solid angle in a meandering manner according to the movement of mirror 6. In this way, LIDAR device 1 is capable of scanning the solid angle using beam 4. As a result of the increased number of generated beams 4, 12, device 1 includes multiple detector elements 14 that are adapted to the number and orientation of beams 4, 12. For mirror 6 to be able to be designed mechanically more simply, same may also rotate along vertical rotation axis V in a direction of rotation and be shielded in a certain angle range, so that beams 4, 12 may leave device 1 only at a defined horizontal angle. In order to receive beams 16 reflected off objects 17, device 1 includes a receiving device 18 or receiving optics 18 that is also rotatable or pivotable synchronously with mirror 6 and that focuses reflected beams 16 and deflects them onto defined detector elements 14. This makes it possible to assign defined detector elements 14 to certain beams 4, 12, 16, so that a swivel angle may be displayed on a detector fully or at least partially. In FIG. 1*b*, mirror 6 may have a swivel angle along horizontal rotation axis H that is modified with regard to FIG. 1*a*. According to the exemplary embodiment, beam splitter 8 is designed statically with regard to a vertical orientation. Beam splitter 8 is rotatable synchronously with mirror 6, but partially permeable mirrors 10 are not readjusted according to the exemplary embodiment. However, this is also technically implementable.

Figure 2:
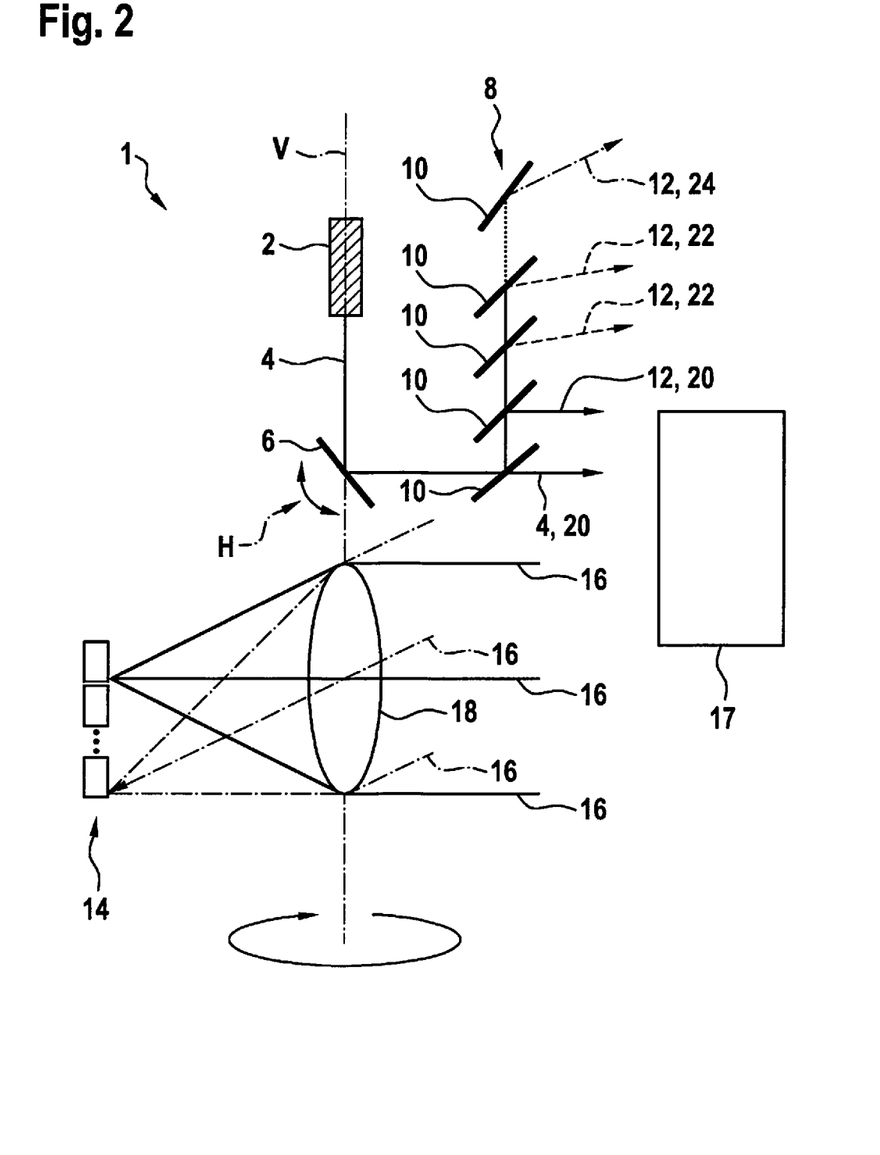
FIG. 2 shows a schematic illustration of a LIDAR device according to a second exemplary embodiment.

FIG. 2 shows a LIDAR device 1 according to a second exemplary embodiment. In contrast to the first exemplary embodiment, LIDAR device 1 includes a beam splitter 8 that branches off or deflects generated beams 4, 12 in such a way that beams 4, 12 may be combined to form three beam groups 20, 22, 24 having beams 4, 12 running in parallel to one another within a beam group 20, 22, 24. Beams 4, 12 of different beam groups 20, 22, 24 have an angular offset with regard to one another. According to the exemplary embodiment, adjacent beams 4, 12 are combined in each case to form a beam group 20, 22, 24.

Figure 3:
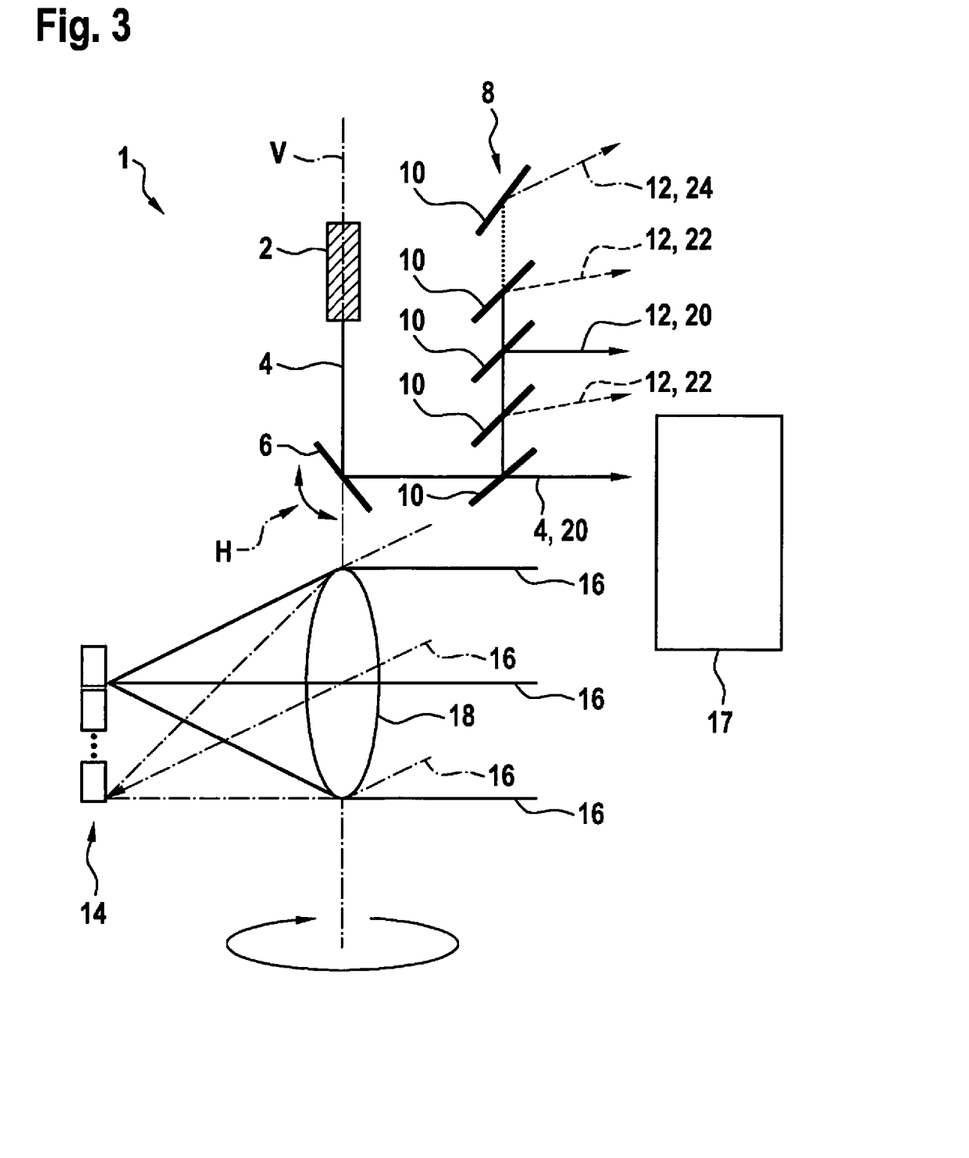
FIG. 3 shows a schematic illustration of a LIDAR device according to a third exemplary embodiment.

FIG. 3 shows a LIDAR device 1 according to a third exemplary embodiment. In contrast to the second exemplary embodiment, not adjacent generated beams 4, 12, but multiple beams 4, 12 that are separated from one another by one or multiple other beams 12, are combined in each case to form a beam group 20, 22, 24 in the third exemplary embodiment.

Figure 4:
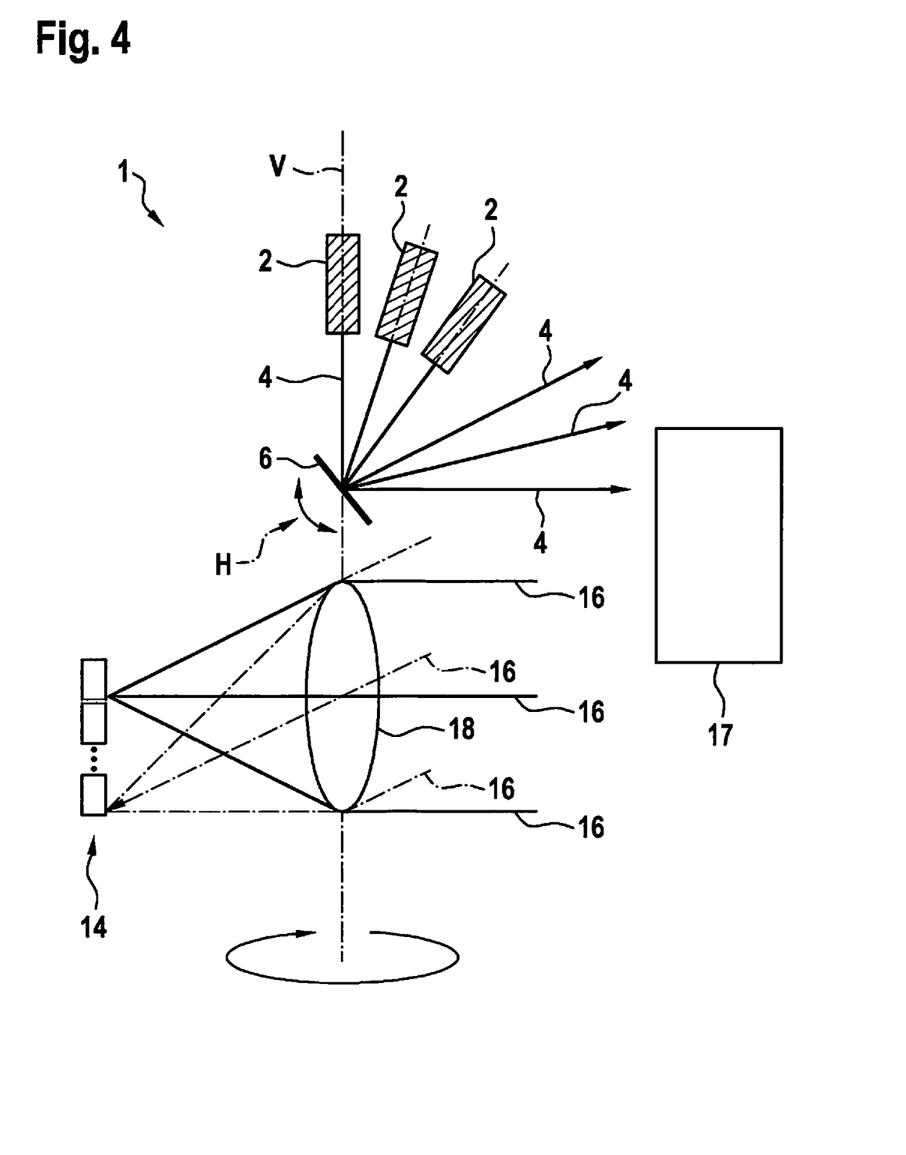
FIG. 4 shows a schematic illustration of a LIDAR device according to a fourth exemplary embodiment.

FIG. 4 shows a LIDAR device 1 according to a fourth exemplary embodiment. In contrast to the exemplary embodiments shown thus far, LIDAR device 1 does not have a beam splitter 8 in this case. Multiple beams 4 are generated by multiple beam sources 2 or separate lasers 2. Lasers 2 have an angular offset with regard to one another. Lasers 2 are positioned in such a way that all generated beams 4 hit mirror 6 at the point of intersection with vertical rotation axis V. Generated beams 4 also have an angular offset that corresponds to the angular offset of laser 2. In this way, generated beams 4 spread according to the angulation defined by lasers 2 even after the deflection by mirror 6.

What is claimed is:

1. A method for scanning solid angles using electromagnetic beams, the method comprising:
   generating electromagnetic beams;
   deflecting at least one of the electromagnetic beams along a horizontal angle and/or along a vertical angle, using a rotatable or pivotable mirror;
   scanning the solid angle using at least two of the electromagnetic beams; and
   receiving at least one reflected electromagnetic beam by a receiving optics that is pivoted synchronously with the mirror along the horizontal angle;
   wherein during a rotation, the mirror performs an uninterrupted movement that is directed into a direction of the rotation, wherein during a pivoting process, the mirror changes a direction of pivoting or rotation upon reaching particular horizontal angles and/or vertical angles, wherein during the rotation or the pivoting, the mirror continuously deflects a generated electromagnetic beam according to an orientation of the mirror, and wherein the mirror has an additional horizontal rotation axis, so that the mirror performs a swiveling movement at a defined vertical angle along the horizontal rotation axis.

2. The method as recited in claim 1, wherein the at least two electromagnetic beams are generated by at least two angularly offset beam sources.

3. The method as recited in claim 1, wherein at least one of the electromagnetic beams is generated by at least one beam source and the at least one of the electromagnetic beams is split into the at least two electromagnetic beams using a beam splitter, which is connected downstream from the mirror, wherein the beam splitter includes multiple partially permeable mirrors that partially let through and partially reflect a generated beam.

4. The method as recited in claim 1, wherein the at least two electromagnetic beams are generated at a distance from one another.

5. The method as recited in claim 1, wherein the at least two electromagnetic beams are generated at an angular offset with regard to one another.

6. The method as recited in claim 1, wherein at least two parallel electromagnetic beams are combined to form at least one beam group.

7. The method as recited in claim 6, wherein the at least two parallel electromagnetic beams of at least one beam group are generated in such a way so that they are oriented in parallel to one another.

8. The method as recited in claim 1, wherein the at least one reflected electromagnetic beam includes at least two reflected electromagnetic beams that are received by the receiving optics and are guided to at least two detector elements.

9. The method as recited in claim 1, wherein at least one detector element is assigned to the at least one of the generated electromagnetic beams based on a distance or an angular offset.

10. The method as recited in claim 1, wherein at least one detector element is assigned to a beam group based on a distance or an angular offset.

11. A LIDAR device for scanning solid angles, comprising:
- at least one beam source to generate electromagnetic beams;
- a pivotable mirror to deflect the generated at least one of the electromagnetic beams along a horizontal angle and/or along a vertical angle; and
- receiving optics, which is rotatable synchronously with the mirror, to receive at least one of the electromagnetic beams reflected off an object,
- wherein the scanning takes place using at least two angularly and/or laterally offset partial beams, which are obtained by splitting the at least one of the electromagnetic beams;
- wherein during a rotation, the mirror performs an uninterrupted movement that is directed into a direction of the rotation, wherein during a pivoting process, the mirror changes a direction of pivoting or rotation upon reaching particular horizontal angles and/or vertical angles, wherein during the rotation or the pivoting, the mirror continuously deflects a generated electromagnetic beam according to an orientation of the mirror, and wherein the mirror has an additional horizontal rotation axis, so that the mirror performs a swiveling movement at a defined vertical angle along the horizontal rotation axis.

12. The LIDAR device as recited in claim 11, wherein the mirror, the receiving optics, and the detector element, are rotatable dependently on or independently of one another along a vertically running rotation axis.

13. The LIDAR device as recited in claim 12, wherein the mirror is pivotable orthogonally with respect to the vertical rotation axis.

* * * * *